United States Patent
Sheaffer et al.

(10) Patent No.: US 11,841,899 B2
(45) Date of Patent: Dec. 12, 2023

(54) SPATIAL AUDIO FILE FORMAT FOR STORING CAPTURE METADATA

(71) Applicant: Apple Inc., Cupertino, CA (US)

(72) Inventors: Jonathan D. Sheaffer, San Jose, CA (US); Symeon Delikaris Manias, Los Angeles, CA (US); Gaetan R. Lorho, Menlo Park, CA (US); Peter A. Raffensperger, Cupertino, CA (US); Eric A. Allamanche, Sunnyvale, CA (US); Frank Baumgarte, Sunnyvale, CA (US); Dipanjan Sen, Dublin, CA (US); Joshua D. Atkins, Los Angeles, CA (US); Juha O. Merimaa, San Mateo, CA (US)

(73) Assignee: Apple Inc., Cupertino, CA (US)

( * ) Notice: Subject to any disclaimer, the term of this patent is extended or adjusted under 35 U.S.C. 154(b) by 243 days.

(21) Appl. No.: 16/899,019

(22) Filed: Jun. 11, 2020

(65) Prior Publication Data

US 2020/0409995 A1 Dec. 31, 2020

Related U.S. Application Data

(60) Provisional application No. 62/868,738, filed on Jun. 28, 2019.

(51) Int. Cl.
*G06F 16/683* (2019.01)
*G06F 16/174* (2019.01)
*H04R 1/40* (2006.01)
*H04R 3/00* (2006.01)

(52) U.S. Cl.
CPC ........ *G06F 16/683* (2019.01); *G06F 16/1744* (2019.01); *H04R 1/406* (2013.01); *H04R 3/005* (2013.01); *H04R 2410/00* (2013.01)

(58) Field of Classification Search
None
See application file for complete search history.

(56) References Cited

U.S. PATENT DOCUMENTS

| 10,334,357 B2 | 6/2019 | Atkins et al. |
| 2009/0080632 A1 | 3/2009 | Zhang et al. |
| 2015/0092950 A1 | 4/2015 | Kim et al. |
| 2016/0021476 A1 | 1/2016 | Robinson et al. |
| 2018/0139535 A1 | 5/2018 | Cengarle et al. |
| 2019/0132674 A1 | 5/2019 | Vilkamo |

(Continued)

FOREIGN PATENT DOCUMENTS

| CN | 105981412 | 9/2016 |
| CN | 109791769 | 5/2019 |

OTHER PUBLICATIONS

Getting Started with VVEncode, http://www.waudio.com/sites/vvaudio7/files/Getting Started with VVEncode.pdf (last accessed Jan. 12, 2023) (copyright 2015) (Year: 2016).*

(Continued)

*Primary Examiner* — Walter F Briney, III
(74) *Attorney, Agent, or Firm* — Aikin & Gallant, LLP

(57) ABSTRACT

A device with microphones can generate microphone signals during an audio recording. The device can store, in an electronic audio data file, the microphone signals, and metadata that includes impulse responses of the microphones. Other aspects are described and claimed.

20 Claims, 4 Drawing Sheets

(56) References Cited

U.S. PATENT DOCUMENTS

2020/0058310 A1* 2/2020 Goodwin ............... G10L 19/00
2020/0145778 A1* 5/2020 Laaksonen ............. H04S 7/304
2022/0038841 A1 2/2022 Eubank et al.

OTHER PUBLICATIONS

VVAudio Support, https://web.archive.org/web/20160901073745/http://www.waudio.com/support (archived Sep. 1, 2016) (last accessed Jan. 12, 2023) (Year: 2016).*
VVAudio Products, https://web.archive.org/web/20160902230129/http://www.vvaudio.com/products/VVEncode (archived Sep. 2, 2016) (last accessed Jan. 12, 2023) (Year: 2016).*
VVEncode, https://web.archive.org/web/20160902230129/http://www.vvaudio.com:80/products/VVEncode (archived Sep. 2, 2016) (last accessed Jan. 12, 2023) (Year: 2016).*
Herre, Juergen, et al., "MP3 Surround: Efficient and Compatible Coding of Multi-Channel Audio", May 1, 2004, 14 pages.
Office Action and Search Report for Chinese Application No. 2020105914391 dated Jul. 1, 2021, 13 pages.
Notification of Second Office Action for Chinese Application No. 2020105914391 datedd Jan. 6, 2022, 5 pages.

* cited by examiner

SPATIAL AUDIO FILE FORMAT FOR STORING CAPTURE METADATA

CROSS-REFERENCE TO RELATED APPLICATION

This application claims the benefit of U.S. Provisional Patent Application No. 62/868,738, filed Jun. 28, 2019.

FIELD

One aspect of the disclosure relates to an audio file format that includes metadata relating to the capture device.

BACKGROUND

Audio capture devices such as microphones or devices with microphones can sense sounds by converting changes in sound pressure to an electrical signal with an electro-acoustic transducer. The electrical signal can be digitized with an analog to digital converter (ADC) and encoded to form an audio file having a known file format, for example, AIFF, AU, FLAC, MPEG 4-LSL, MPEG-4ALS, WMA Lossless, Opus, MP3, first or higher order Ambisonics, etc. A decoder can decode the file format and generate a set of audio signals with the decoded audio file that can be used to drive speakers.

SUMMARY

Audio file formats exist that have audio data formatted to a specific playback configuration, e.g., stereo, 5.1, or 7.1. Such audio formatting can be specific to a predefined speaker arrangement. In such a case, less-than-ideal placement of speakers, however, can result in an unpleasant audio playback experience.

In addition, audio files that are formatted for playback lack flexibility. The task of converting from one audio format to another can be inefficient and audio data can be lost in conversion—the original sound recorded by a device is difficult to reproduce.

Ambisonic audio recordings, e.g., B-Format or higher order, have flexibility when compared to audio files formatted to specific playback configurations because Ambisonic recordings can be rendered to different playback configurations. Ambisonic audio recording files do not specify or require a particular playback arrangement. Ambisonic capture devices, however, require a special microphone array with mics arranged precisely in a particular arrangement (e.g., a spherical array). Such mic placement may not be practical with all capture devices (e.g., a mobile phone or tablet computer).

In addition, first order Ambisonic recordings have low spatial resolution. This can result in blurry sound sources. Higher-order Ambisonics can provide higher resolution, but then the resulting audio file can grow to a large size, making it unwieldy. For example, a 12th order Ambisonic recording can require a uniform or near uniform spherical microphone array arrangement having 169 channels, because the number of channels is defined by $(M+1)^2$ where M is the order. The channels are formatted in one of numerous higher-order Ambisonic formatting conventions for example ACN, SID, Furse-Malham or others and different normalization schemes such as N3D, SN3d, N2D, SN2D, maxN or others, which can result in additional loss.

An audio data file can be generated to have flexibility in different playback configurations. A playback device or formatting device can process the user's raw mic data in a manner of the device's choosing. For example, the playback device may beamform or spatialize the raw mic data using metadata of the audio data file. The metadata can include one or more impulse responses of the microphones of the capture device. The impulse response data can be used on the playback side to filter the raw mic data to provide a more immersive audio experience.

In one aspect of the present disclosure, an electronic audio data file is described. The file can include raw audio data of two or more microphone signals; and metadata. The metadata can have an impulse response or transfer functions for each of the two or more microphones of a recording or capture device. Each impulse response or transfer function can define a response of one of the two or more microphones to an acoustic impulse.

In one aspect, a method for capturing and/or processing audio includes receiving a microphone signal from a microphone of a capture device; storing, in an electronic audio data file, a) the microphone signal, and b) metadata, the metadata including one or more impulse responses of the microphone of the capture device, where the one or more impulse responses define a response of the microphone to an acoustic impulse.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, algorithms, structures, and techniques have not been shown in detail so as not to obscure the understanding of this description.

Generating Audio File with Capture Device Information

Figure 1:
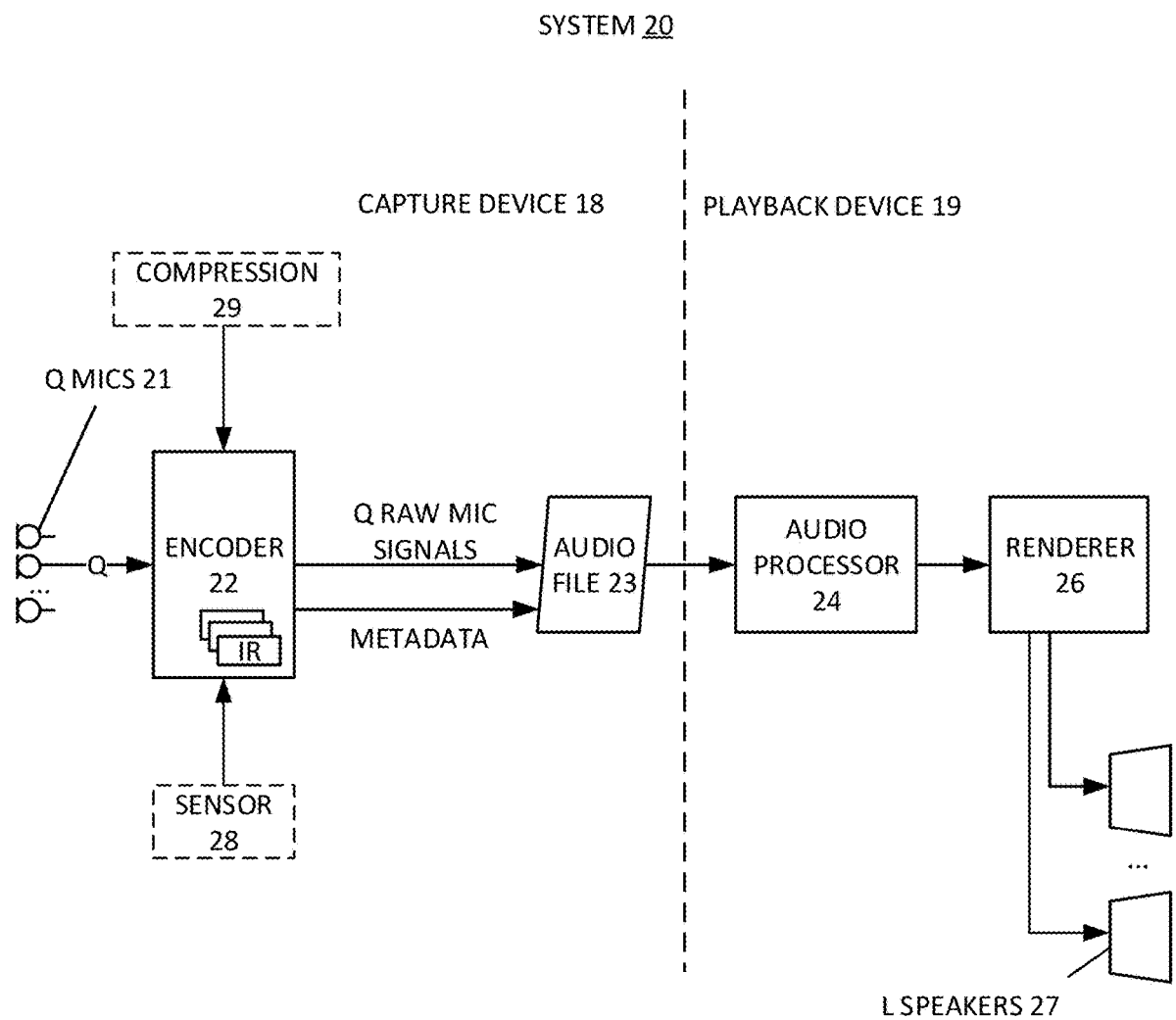
FIG. 1 illustrates a system for producing an audio file with metadata describing the capture device, according to one aspect.

Referring now to FIG. 1, a system 20 includes a capture device 18 that generates an audio file. The audio file contains metadata that includes information regarding the capture device. The device can include a plurality (Q) of microphones that can generate Q microphone signals. The Q microphones can have a fixed and known arrangement on a capture device, forming one or more microphone arrays. The microphones can have electro-acoustic transducers that convert sensed sound (e.g., variations in pressure) into electric signals (e.g., analog microphone signals). Those analog signals can be digitized by analog to digital converters (ADC) to generate digital microphone signals.

An encoder 22 can produce an electronic audio file 23 having the microphone signals or the raw audio data extracted from the microphone signals (e.g., truncated or cut versions of the microphone signals). The stored microphone signals can be unformatted (e.g., not being upmixed or downmixed), unfiltered, and/or uncompressed. The encoder produces metadata of audio file 23, the metadata including a plurality of impulse responses of the Q microphones of the capture device 18. Each impulse response can define an acoustic response of one of the microphones to an acoustic impulse at a particular location in space. By storing the impulse response of the capture device with the microphone signals, a playback device can use the impulse responses of the capture device to process the microphone signals to perform, for example, beamforming, spatialization, and localization of sound sources.

In one aspect, the metadata can be compressed by a compression module 29. The number of impulse responses stored in the audio file can depend on the desired spatial resolution and 'coverage' of the audio file. The size of the audio file grows as the spatial resolution and spatial 'coverage' increases. Thus, the impulse responses, or filters that represent the impulse responses (e.g., finite impulse response filters (FIRS) having filter taps and coefficients thereof), can be compressed by known compression algorithms to reduce the size of the metadata and audio file.

In one aspect, the capture device includes a sensor 28, for example, an inertial measurement unit formed from a combination of accelerometers, gyroscopes, and/or magnetometers. The device can process the sensor data to determine an orientation of the device (e.g., an absolute or relative tilt of the device in three dimensional space). In one aspect, the sensor 28 can include a camera. Images from the camera can be processed to track the device with known visual odometry and/or simultaneous localization and mapping (SLAM) algorithms. The orientation of the device can be tracked and recorded simultaneously with the capturing of audio, such that the audio file is generated with device orientation data that is time-synchronized with the microphone signals or raw audio data (e.g., on a frame by frame basis).

In one aspect, a decoder or playback device 19 can receive the audio data file and decode the audio data file having the microphone signals and the metadata. The decoder/device 19 can have an audio processor 24 that generates beamforming filters based on the impulse response of each of the microphones. In such a case, a renderer 26 can apply the beamforming filters to the raw audio data to generate a plurality L of beamformed signals. The beamformed signals can be used to drive speakers 27 of the playback device.

In one aspect, the audio processor of the playback device can use the impulse response of the audio file to generate spatializing filters. The renderer 26 can apply those spatial filters to the raw microphone signals of the audio file and drive the speakers with the spatialized audio signals. In one aspect, the device can localize sounds in the microphone signals based on the impulse responses and/or recognize speech and/or voice activity in the microphone signals.

Combining the impulse responses of the microphones with the raw microphone signals into an audio file provides a freedom to the playback device as to how to filter and format the microphone signals for playback. In one aspect, the playback device can include an upmixer/downmixer to upmix/downmix the microphone signals to a desired playback configuration (e.g., stereo, 5.1 or 7.1).

Audio File Metadata

Figure 2:
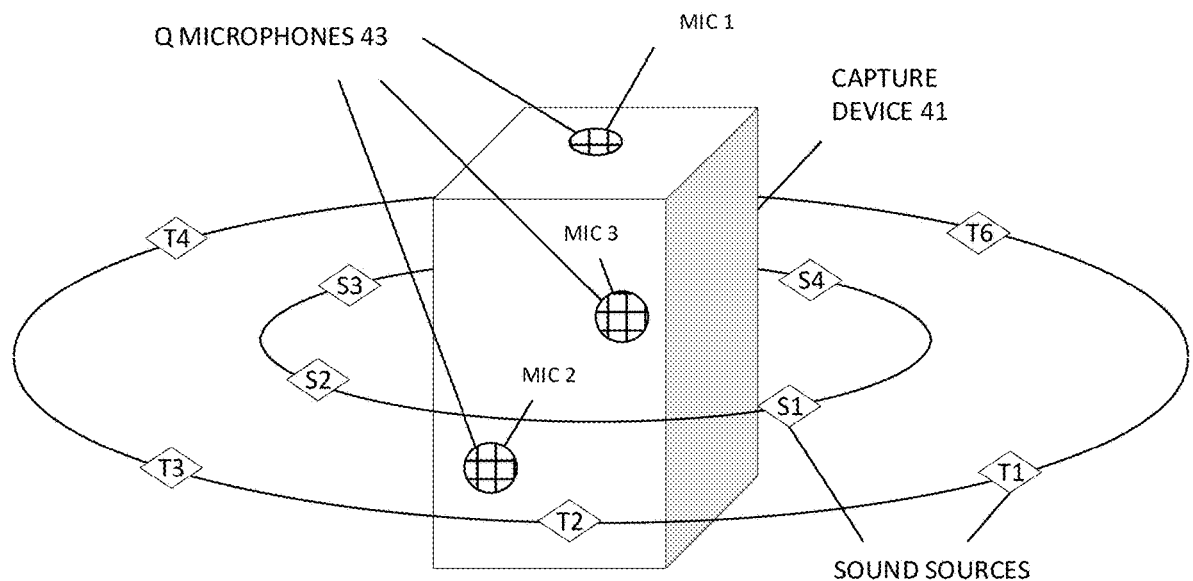
FIG. 2 illustrates a capture device with microphones and sound sources, according to one aspect.
Figure 3:
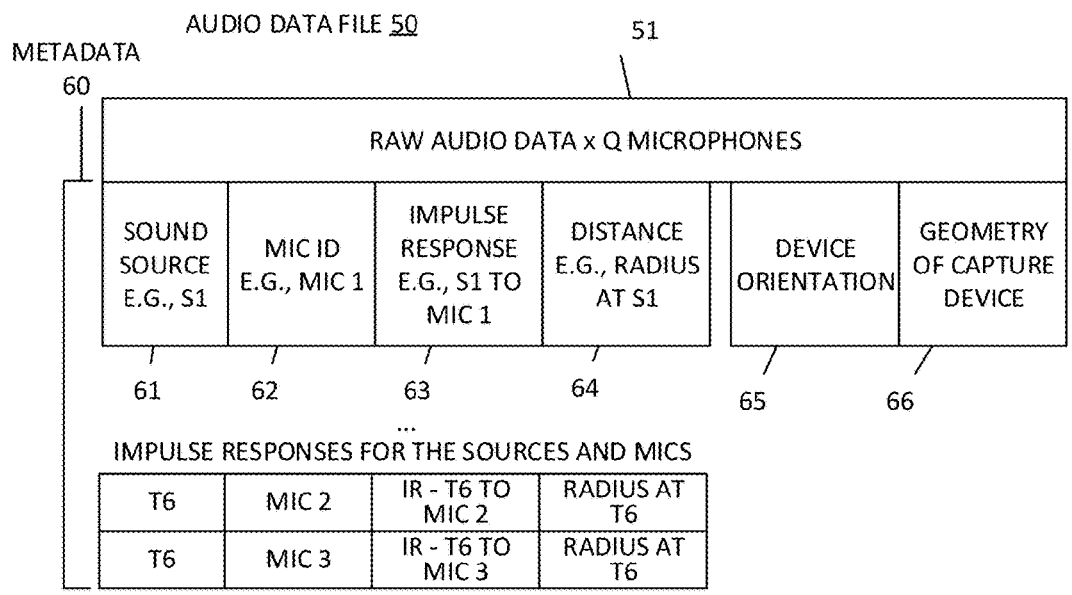
FIG. 3 illustrates an audio file with metadata describing the capture device, according to one aspect.

FIGS. 2 and 3 can be discussed together in relation to generating an audio file having metadata that includes an impulse response of the capture device. A capture device 41 is shown in FIG. 2 as having a plurality of microphones 43. Although illustrated as a box, the capture device can be a device having two or more microphones such as, but not limited to, a tablet computer, a smart phone, a laptop, a headworn device (e.g., 'smart' glasses, a headphone set, a head mounted display (HMD)), a microphone array, and a smart speaker. Microphones 43 can generate microphone signals containing sounds sensed by the microphones.

FIG. 3 illustrates an audio data file 50, according to one aspect. The raw data 51 of the microphones (e.g., digitized microphone signals) can be stored in audio data file 50. In one aspect, the audio data file 50 contains one or more impulse responses 63. Each impulse response of the metadata can be formed as a digital filter.

In one aspect, the impulse responses can be associated with sound location identifiers 61 to indicate a location or direction (e.g., an azimuth or azimuth and elevation) in space of an acoustic impulse that the associated impulse response is calculated based on. For example, sound sources S1-S4 can be an index of sound locations at a distance or radius around the capture device. Although shown as a circular ring, this can be a sphere as well. In one aspect, the total number of sound sources on a ring or sphere can range from less than ten to several thousands. The number of sound sources can be selected based on application specific considerations, e.g., how much spatial resolution is desired. A location of a sound source can be described by a direction (e.g., an azimuth for a ring, and an azimuth and elevation for a sphere) and a distance (e.g., a radius) from a point designated as a center of the device. It should be understood that the sound source location is not confined to a position on a ring or sphere and that, in one aspect, the location of the sound source can be described in with any coordinate system (e.g., x, y, and z) that describes the sound location relative to the device.

In one aspect, the metadata includes a microphone identifier 62 for each of the microphones of the capture device. Each of the impulse responses can be associated with a microphone, as well as a sound source. For example, one of the impulse responses can have a sound source identifier S1 and microphone identifier 'MIC 1' that describe the impulse response of an acoustic impulse from location S1 to MIC 1. Another impulse response can have the same sound source identifier S1 but microphone identifier 'MIC 2', describing the impulse response of MIC 2 in response to an acoustic impulse at location S1. In one aspect, an impulse response (e.g., a digital filter) can define a response to an acoustic impulse between each sound source location that is supported and defined in the audio data file and each microphone of the capture device. The impulse response can include characteristics of the electro-acoustic transducer of the corresponding microphone.

For example, each of S1-S4 can have three impulse responses (MICs 1-3). Similarly, each of T1-T6 sound sources can have three impulse responses (MICs 1-3). As the number of impulse responses grows, the spatial resolution of the audio file will improve, however, the size of the file will also grow. Thus, the overall number of impulse responses to be included in the metadata of the audio file can be application specific and/or determined based on design trade-offs.

In one aspect, the metadata includes a sound source location relative to the capture device. For example, the impulse responses are associated with a sound source location identifier, in the metadata, that represents a location of the acoustic impulse of the corresponding impulse response. The sound source can be defined as being on a ring or sphere around the article of manufacture, although not required. The metadata can include a distance or radius of the ring from the capture device. To illustrate, FIG. 2, S1-S4 can have the same radius or distance R1 from the capture device but at different positions on the ring. Other impulse responses for sound locations T1-T6 can have a radius or distance R2 from the capture device. In one aspect, the audio data file does not include or require an ideal microphone configuration, e.g., a spherical array of microphones.

In one aspect, the audio data file 50 can include a geometrical model (e.g., a three dimensional 'mesh' or CAD drawing) of the capture device and positions of the microphones arranged on the capture device. This can further be used by the playback device or decoder to process the raw audio (e.g., by generating beamforming filters or spatial filters).

In one aspect, at least one of the one or more impulse responses is a near-field impulse response (e.g., a response to an impulse within 2 wavelengths of the corresponding microphone or capture device) and at least one of the impulse responses is a far field impulse response (e.g., a response to an impulse greater than 2 wavelengths from the corresponding microphone and capture device). A playback device can use the near field and far field impulse responses to localize sounds that are present in the raw audio files (e.g., for Voice Activity Detection).

In one aspect, as described in other sections, the metadata can include a device orientation. The device orientation describing how the capture device is rotated or tilted can vary in time through the recording. For example, a mobile phone can be used to record sound. During the recording, a user can hold the phone in different ways (e.g., flipping it, rotating it, etc.). Thus, the device orientation can be time-varying and synchronized in time with the captured microphone signals (e.g., on a frame by frame basis).

Although one aspect of the metadata is shown, it should be understood that the metadata can be arranged in numerous manners to organize and index the impulse responses for sound source locations relative to microphones of the capture device.

In one aspect, the audio data file can include other features not shown in FIG. 3. For example, the audio data file can include noise characteristics and a dynamic range of the audio file. In one aspect, a sensitivity parameter that indicates a sensitivity of a microphone array is included in the audio data file. A decoding/playback device can determine an original sound pressure level of a recording based on the sensitivity parameters and the microphone signals. In one aspect, the microphone signals and metadata are communicated or streamed, for example, to another device over a network, as a bitstream. In such a case, the metadata can be associated with the microphone signals through a streamed audio data file or by other established means (e.g., through a communication protocol that associates the streamed metadata with the streamed microphone signals).

Process for Generating an Audio Data File with Metadata

Figure 4:
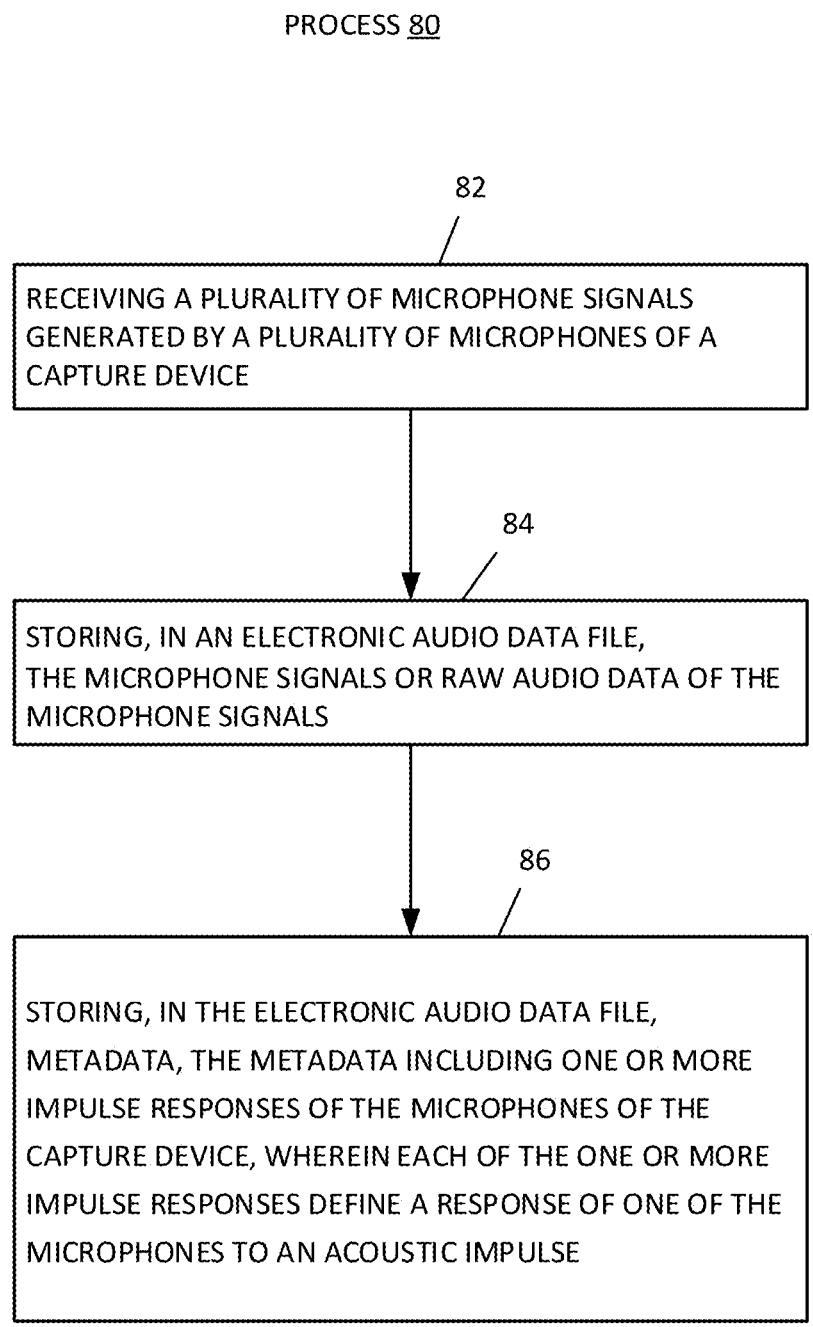
FIG. 4 illustrates a process or method for producing an audio file with metadata describing the capture device, according to one aspect.

Referring now to FIG. 4, a process or method 80 is described, that can be performed by a processor, e.g., of a capture device. At block 82, the process can include receiving one or more microphone signals generated by a plurality of microphones (e.g., two or more microphones) of a capture device. At block 84, the process can include storing, in an electronic audio data file, the microphone signals or raw audio data of the one or more microphone signals. The audio file can be stored in electronic memory (e.g., RAM or ROM). At block 86, the process can include storing, in metadata of the electronic audio data file, one or more impulse responses of the microphones of the capture device, wherein each of the one or more impulse responses define a response of one of the microphones to an acoustic impulse. It should be understood that the term 'impulse response' shall be interchangeable with 'transfer function' (or any data set that can be transformed into an acoustical transfer function between a source and a microphone), for all aspects of the present disclosure—a transfer function can represent an impulse response in the frequency domain. For example, in one aspect, a process for generating an audio data file with metadata includes: receiving a plurality of microphone signals from a plurality of microphones of a capture device; and storing, in an electronic audio data file, the microphone signals, and metadata, the metadata including one or more transfer functions of the microphones of the capture device, wherein the one or more transfer functions define responses of the microphones to acoustic impulses. An impulse response can be derived in various ways, including, but not limited to, recording of the microphone signal as a response to an acoustic impulse generated at a defined location, or a simulation of the device acoustics and microphone responses based on a physical model. For acoustic measurements, commonly an anechoic chamber is used to reduce undesired reflections. If the device is intended to be attached to another object during regular use while recording the microphone signals, the impulse response measurements or simulation can also include that object as well, for example an impulse response or transfer function of a headworn device can be measured or simulated with a person, or model/manikin that is representative of whoever will wear the device during regular use.

Figure 5:
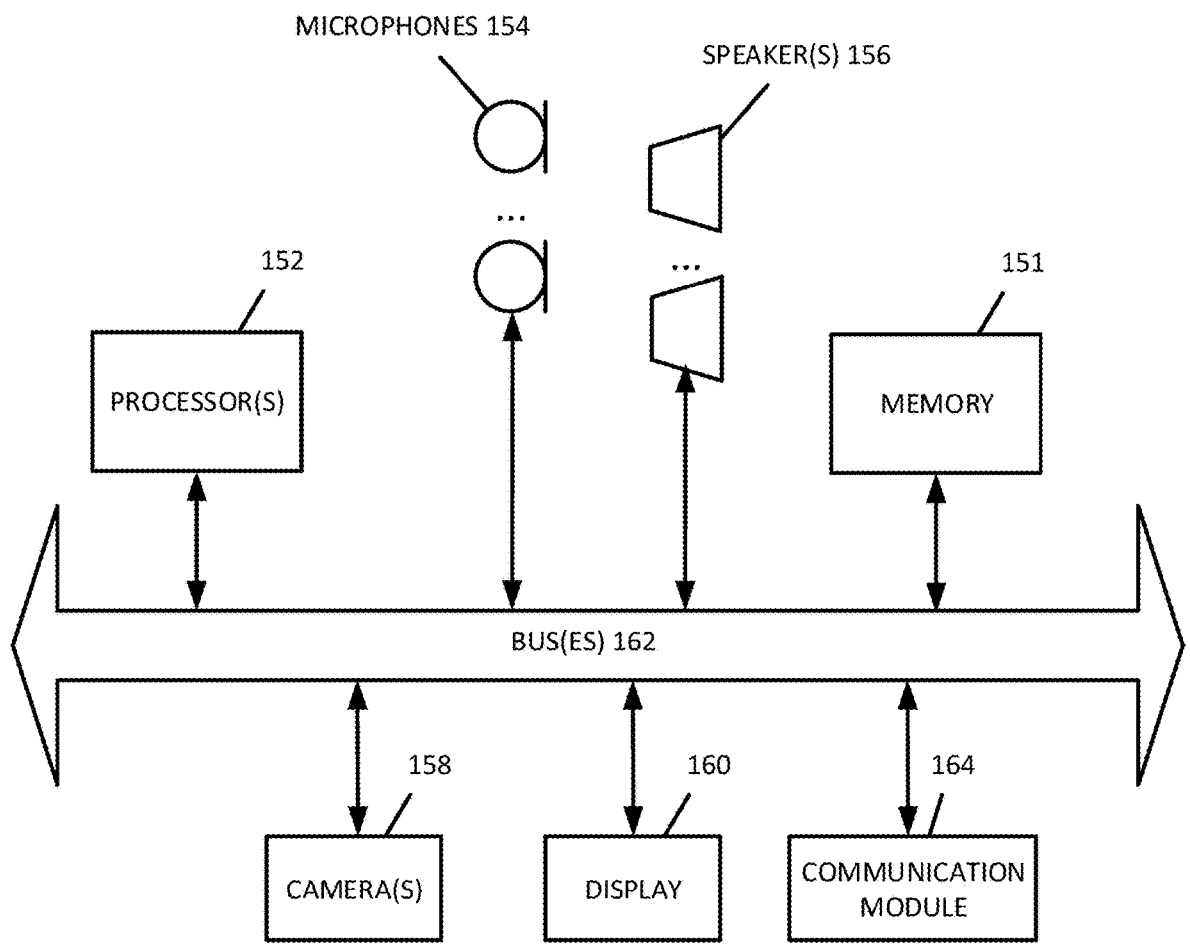
FIG. 5 illustrates an example of audio system hardware, according to one aspect.

FIG. 5 shows a block diagram of audio processing system hardware, in one aspect, which may be used with any of the aspects described. This audio processing system can represent a general purpose computer system or a special purpose computer system. Note that while FIG. 5 illustrates the various components of an audio processing system that may be incorporated into headphones, speaker systems, microphone arrays and entertainment systems, it is merely one example of a particular implementation and is merely to illustrate the types of components that may be present in the audio processing system. FIG. 5 is not intended to represent any particular architecture or manner of interconnecting the components as such details are not germane to the aspects herein. It will also be appreciated that other types of audio processing systems that have fewer components than shown or more components than shown in FIG. 5 can also be used. Accordingly, the processes described herein are not limited to use with the hardware and software of FIG. 5.

As shown in FIG. 5, the audio processing system 150 (for example, a laptop computer, a desktop computer, a mobile phone, a smart phone, a tablet computer, a smart speaker, a head mounted display (HMD), a headphone set, or an infotainment system for an automobile or other vehicle) includes one or more buses 162 that serve to interconnect the various components of the system. One or more processors 152 are coupled to bus 162 as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 151 can include Read Only Memory (ROM), volatile memory, and non-volatile memory, or combinations thereof, coupled to the bus using techniques known in the art. In one aspect, a camera 158 and/or display 160 can be coupled to the bus.

Memory 151 can be connected to the bus and can include DRAM, a hard disk drive or a flash memory or a magnetic optical drive or magnetic memory or an optical drive or other types of memory systems that maintain data even after power is removed from the system. In one aspect, the processor 152 retrieves computer program instructions stored in a machine readable storage medium (memory) and executes those instructions to perform operations described herein.

Audio hardware, although not shown, can be coupled to the one or more buses 162 in order to receive audio signals to be processed and output by speakers 156. Audio hardware can include digital to analog and/or analog to digital converters. Audio hardware can also include audio amplifiers and filters. The audio hardware can also interface with microphones 154 (e.g., microphone arrays) to receive audio signals (whether analog or digital), digitize them if necessary, and communicate the signals to the bus 162.

Communication module 164 can communicate with remote devices and networks. For example, communication module 164 can communicate over known technologies such as Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses 162 can be connected to each other through various bridges, controllers and/or adapters as is well known in the art. In one aspect, one or more network device(s) can be coupled to the bus 162. The network device(s) can be wired network devices (e.g., Ethernet) or wireless network devices (e.g., WI-FI, Bluetooth). In some aspects, various aspects described (e.g., simulation, analysis, estimation, modeling, object detection, etc.,) can be performed by a networked server in communication with the capture device.

Various aspects described herein may be embodied, at least in part, in software. That is, the techniques may be carried out in an audio processing system in response to its processor executing a sequence of instructions contained in a storage medium, such as a non-transitory machine-readable storage medium (e.g. DRAM or flash memory). In various aspects, hardwired circuitry may be used in combination with software instructions to implement the techniques described herein. Thus the techniques are not limited to any specific combination of hardware circuitry and software, or to any particular source for the instructions executed by the audio processing system.

In the description, certain terminology is used to describe features of various aspects. For example, in certain situations, the terms "module", "encoder", "processor", "renderer", "combiner", "synthesizer", "mixer", "localizer", "spatializer", and "component," are representative of hardware and/or software configured to perform one or more processes or functions. For instance, examples of "hardware" include, but are not limited or restricted to an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined or removed, performed in parallel or in serial, as necessary, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as, special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination hardware devices and software components.

While certain aspects have been described and shown in the accompanying drawings, it is to be understood that such aspects are merely illustrative of and not restrictive on the broad invention, and the invention is not limited to the specific constructions and arrangements shown and described, since various other modifications may occur to those of ordinary skill in the art. For example, the features discussed in relation to FIG. 3 can be combined in the audio file produced in connection with FIGS. 1 and 4. The description is thus to be regarded as illustrative instead of limiting.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A method for processing audio comprising:
   capturing, by a plurality of microphones of a capture device, a plurality of microphone signals;
   generating metadata that is independent of the microphone signals, the metadata including;
      an impulse response for each microphone of the plurality of microphones of the capture device, wherein each impulse response defines a response of an acoustic impulse between a sound source and a respective microphone, and
      a distance between the sound source and the capture device;
   compressing the metadata;
   storing, in an electronic audio data file,
      the microphone signals, and
      the compressed metadata that is independent of the microphone signals; and
   sending the electronic audio data file to a receiving device for the receiving device to use the impulse responses and the distance to spatially render the plurality of microphone signals.

2. The method of claim 1, wherein each impulse response of the metadata is formed as digital filters.

3. The method of claim 1, wherein the metadata includes one or more sound location identifiers that associates each impulse responses to a location or position of the sound source relative to the capture device.

4. The method of claim 1, wherein the metadata includes microphone identifiers of each microphone of the capture device, and each impulse response is associated with a microphone identifier.

5. The method of claim 1, wherein the metadata includes a location of the sound source relative to the capture device.

6. The method of claim 1, wherein the metadata includes a geometrical model of the capture device and positions of the microphones arranged on the capture device.

7. The method of claim 1, wherein at least one impulse response is a near-field impulse response.

8. The method of claim 1, wherein at least one impulse response is a far-field impulse response.

9. The method of claim 1, wherein the metadata includes a time-varying orientation of the capture device, the time-varying orientation being synchronized in time with the microphone signals.

10. The method of claim 1, further comprising
    generating beamforming filters based on the one or more impulse responses and processing the microphone signals with the beamforming filters based on the one or more impulse responses to generate one or more beamformed signals.

11. The method of claim 1, wherein the microphone signals are uncompressed, unfiltered.

12. The method of claim 1 further comprising determining a number of impulse responses to be stored in the electronic audio data file according to a desired spatial resolution of the electronic audio data file, wherein the metadata includes the number of impulse responses.

13. The method of claim 1, wherein the capture device is a tablet computer.

14. The method of claim 1, wherein the capture device is a smart phone.

15. The method of claim 1, wherein the capture device is a headworn device.

16. An electronic device, comprising:
    a processor;
    a plurality of microphones that generate a plurality of microphone signals; and
    a machine readable medium having stored therein instructions that, when executed by the processor, cause the electronic device to:
       compress metadata including a plurality of datasets, each of the plurality of datasets including 1) an acoustic transfer function between a sound source and one of the plurality of microphones and 2) a distance between the sound source and the electronic device; and
       communicate, to a decoding device, a bit stream that includes:
          the plurality of microphone signals, and
          the compressed metadata that is independent from the plurality microphone signals, wherein the decoding device is to use the acoustic transfer functions and the distance to spatially render the plurality of microphone signals.

17. The electronic device of claim 16 further comprises a camera.

18. The electronic device of claim 16, wherein
    the metadata includes sound location identifiers that represents a location, arranged on a ring or sphere around the article of manufacture, and
    each dataset is associated with one of the sound location identifiers.

19. The electronic device of claim 16, wherein each dataset defines an impulse response of one of the plurality of microphones.

20. A machine readable medium having stored therein instructions that, when executed by a processor of an electronic device, cause the processor to:
    obtain metadata that includes transfer functions for each of two or more microphones of a capture device, wherein each of the transfer functions is associated with a response of an acoustic impulse between a sound source and one of the two or more microphones, wherein the metadata includes a distance between the sound source and the electronic device;
    compress the metadata;
    generate an electronic audio data file comprising raw audio data of microphone signals generated by the two or more microphones of the capture device;
the compressed metadata; and
send the electronic audio data file to a decoder, wherein the decoder is to use the transfer functions and the distance to spatially render the raw audio data of the microphone signals.

\* \* \* \* \*